(12) United States Patent
Trewiler et al.

(10) Patent No.: US 7,341,431 B2
(45) Date of Patent: Mar. 11, 2008

(54) GAS TURBINE ENGINE COMPONENTS AND METHODS OF FABRICATING SAME

(75) Inventors: Gary Edward Trewiler, Loveland, OH (US); Robert William Bruce, Loveland, OH (US); Charles W. Carrier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/234,437

(22) Filed: Sep. 23, 2005

(65) Prior Publication Data

US 2007/0071608 A1    Mar. 29, 2007

(51) Int. Cl.
*F01D 5/02* (2006.01)
(52) U.S. Cl. ............... 416/213 R; 416/234; 29/889.21
(58) Field of Classification Search ............. 29/889.21; 416/213 R, 234
See application file for complete search history.

(56) References Cited

U.S. PATENT DOCUMENTS

| | | | |
|---|---|---|---|
| 5,161,950 A * | 11/1992 | Krueger et al. ......... 416/204 R |
| 5,188,279 A | 2/1993 | Joyce et al. |
| 5,518,562 A * | 5/1996 | Searle et al. ............... 156/73.5 |
| 5,562,419 A | 10/1996 | Crall et al. |
| 5,795,413 A | 8/1998 | Gorman |
| 6,095,402 A | 8/2000 | Brownell et al. |
| 6,138,896 A | 10/2000 | Ablett et al. |
| 6,340,424 B1 | 1/2002 | Elman et al. |
| 6,471,485 B1 * | 10/2002 | Rossmann et al. .......... 416/230 |
| 6,524,072 B1 * | 2/2003 | Brownell et al. ....... 416/213 R |
| 6,666,653 B1 | 12/2003 | Carrier |
| 6,969,238 B2 * | 11/2005 | Groh et al. ............. 416/213 R |
| 7,008,491 B2 | 3/2006 | Woodfield |

* cited by examiner

*Primary Examiner*—Ninh H. Nguyen
(74) *Attorney, Agent, or Firm*—William Scott Andes; Armstrong Teasdale LLP

(57) ABSTRACT

A method for fabricating a component for a gas turbine engine includes providing a blisk forging fabricated from a first material, inertia welding a second material to the blisk forging to create a bi-alloy blisk forging, and machining the bi-alloy blisk forging to pre-determined dimensions.

19 Claims, 4 Drawing Sheets

US 7,341,431 B2

GAS TURBINE ENGINE COMPONENTS AND METHODS OF FABRICATING SAME

STATEMENT REGARDING FEDERALLY SPONSORED RESEARCH OR DEVELOPMENT

The U.S. Government may have certain rights in this invention pursuant to contract number N00421-03-C-0017.

BACKGROUND OF THE INVENTION

This invention relates generally to turbine components, and more particularly, to components for gas turbine engines and methods of fabricating the same.

Known compressors for use with gas turbine engines include multiple stages or rows of rotor blades and corresponding stator vanes which sequentially increase the pressure of the air flowing therethrough. At least some known compressor rotor blades include airfoils that are integrally formed with a perimeter of a rotor disk in a unitary blisk configuration. However, because the blisk airfoils are integrally formed with the supporting rotor disk, the airfoils are not individually removable or replaceable in the event of foreign object damage (FOD) thereof. More specifically, during operation of a gas turbine engine, a blisk rotating therein may be subject to foreign object damage if foreign objects are ingested into the engine. Such foreign object damage may affect blisk airfoil leading and trailing edges.

In some cases, when the damage to such blisks is only relatively minor, the damage may be simply removed, by grinding for example, thus sizing the airfoil with a less than original configuration. However, such repair techniques may be unacceptable if the repair will cause the aerodynamic performance of the blisk to be degraded, and/or cause rotor imbalance. Furthermore, damage removal may adversely affect strength of the airfoil itself.

During manufacturing of a blisk, the material of the blisk is selected based on a number of loading and environmental considerations. Accordingly, impact and wear resistance of the blisk airfoil edges are not the only design considerations, and as such, the material selected may be a compromise optimized for all performance requirements and not just selected to facilitate maximizing edge impact and wear resistance. As such, at least some known blisks are fabricated as bi-alloy components in which a second material is coupled to a blisk forging fabricated from a first material. More specifically, with known blisk manufacturing methods, initially a blisk forging is machined to a semi-finished condition. An edge material is then coupled to the blisk by a fusion welding process. The blisk is then heat-treated and machined to a final configuration. However, such manufacturing methods are generally time-consuming. Moreover, because of the possibility of distortion from the numerous welds and/or the possibility of defects that may be inherent in the fusion welding, such manufacturing methods may not be cost effective.

BRIEF SUMMARY OF THE INVENTION

In one aspect, a method for fabricating a component for a gas turbine engine is provided. The method comprises providing a blisk forging fabricated from a first material, inertia welding a second material to the blisk forging to create a bi-alloy blisk forging, and machining the bi-alloy blisk forging to pre-determined dimensions.

In another aspect, a method for fabricating a turbine component is provided. The method comprises forging a mass of first material into a desired shape, inertia welding a second material that is different than the first material to the forging, and heat-treating the forging.

In a further aspect, a blisk for a gas turbine engine is provided. The blisk comprises a bi-alloy forging fabricated using inertia welding.

DETAILED DESCRIPTION OF THE INVENTION

Figure 1:
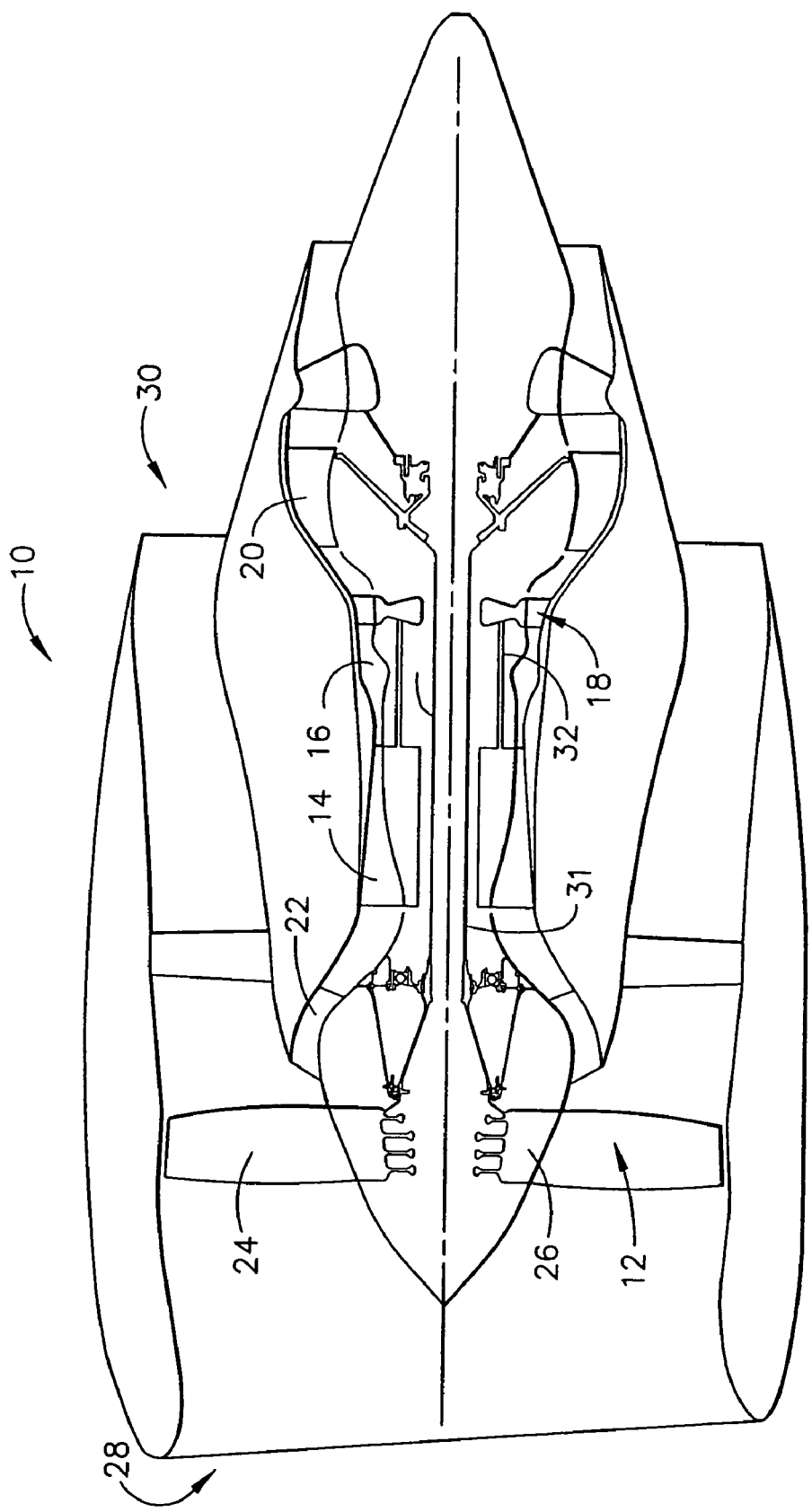
FIG. 1 is a schematic illustration of an exemplary gas turbine engine.

FIG. 1 is a schematic illustration of an exemplary gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. In an alternative embodiment, engine 10 includes a low pressure compressor. Fan assembly 12, booster 22, and turbine 20 are coupled by a first rotor shaft 31, and compressor 14 and turbine 18 are coupled by a second rotor shaft 32.

In operation, air flows through fan assembly 12 and compressed air is supplied to high pressure compressor 14 through booster 22. The highly compressed air is delivered to combustor 16. Hot products of combustion from combustor 16 drives turbines 18 and 20, and turbine 20 drives fan assembly 12 and booster 22 by way of shaft 31.

Figure 2:
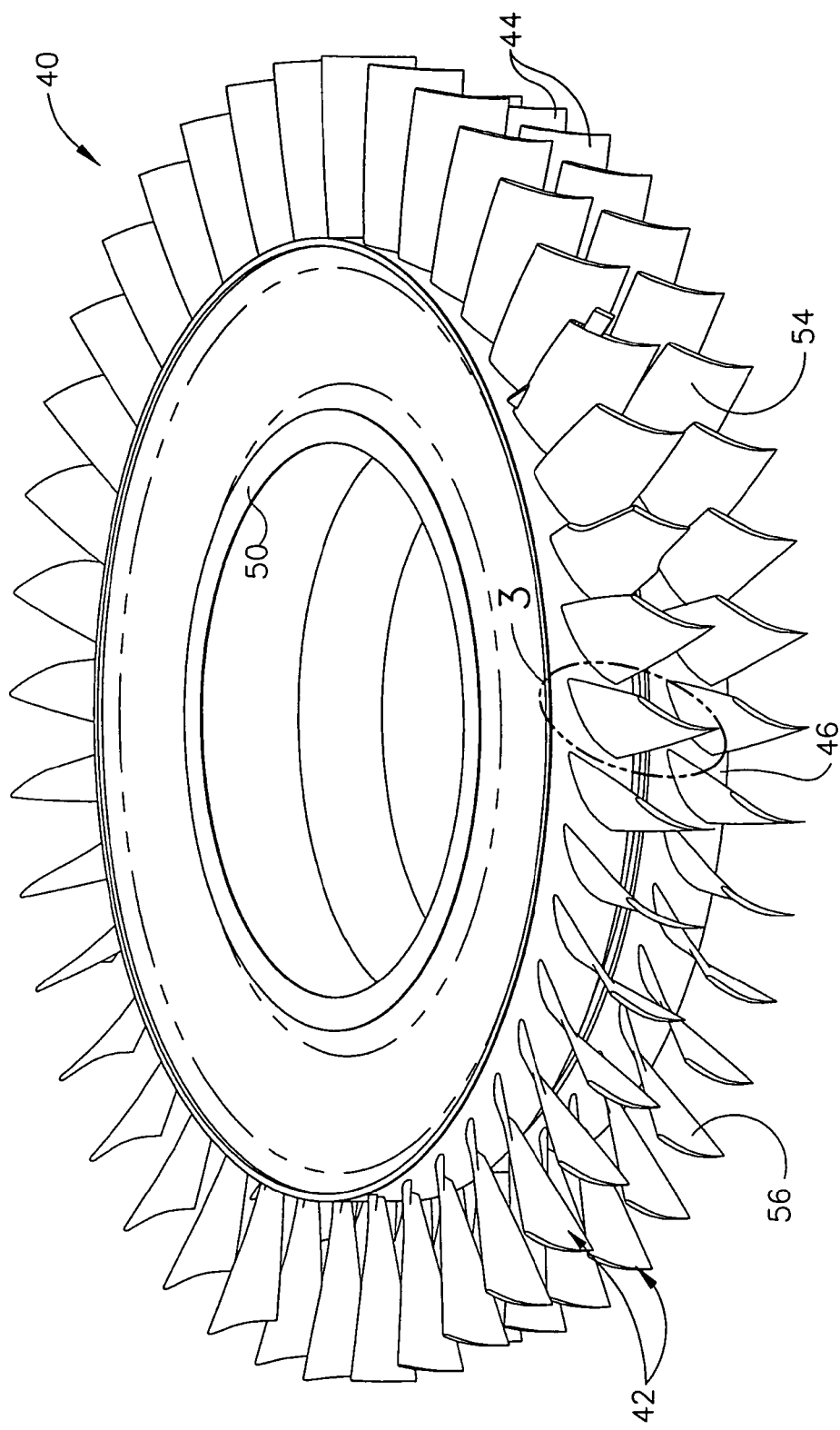
FIG. 2 is a perspective view of an exemplary blisk that may be used with the gas turbine engine shown in FIG. 1.
Figure 3:
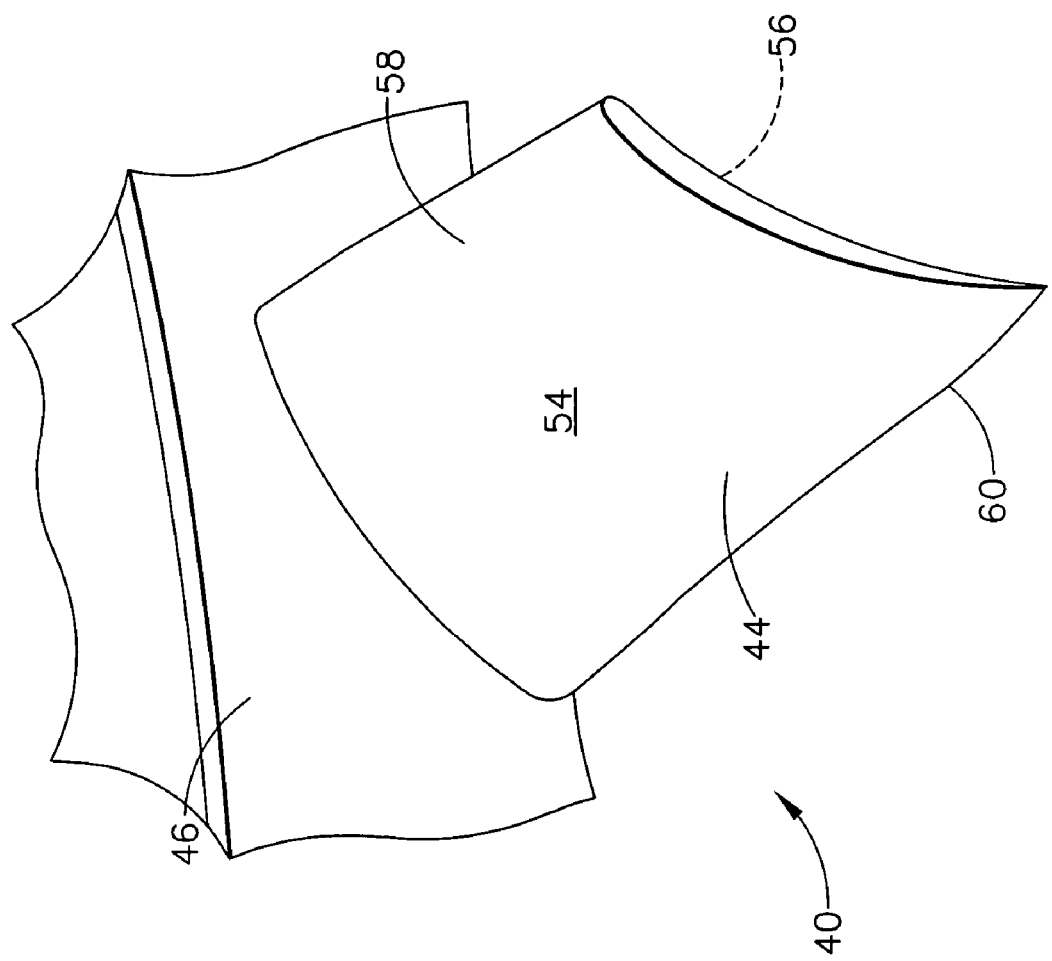
FIG. 3 is an enlarged view of a portion of the blisk shown in FIG. 2 and taken along area 3.

FIG. 2 is a perspective view of an exemplary blisk 40 that may be used with gas turbine engine 10. FIG. 3 is an enlarged view of a portion of blisk 40 taken along area 3. In the exemplary embodiment illustrated in FIG. 2, blisk 40 is in the form of a tandem blisk and includes two rows 42 of compressor rotor airfoils 44 extending radially outwardly from the rims 46 of corresponding annular disks 50. As is known in the art, within blisk 40, airfoils 44 are integrally formed with each supporting disk 50 in a unitary or one-piece assembly therewith without the use of retaining dovetails. As such, the individual airfoils 44 extend radially outwardly from rims 46 or perimeter of disks 50 integrally therewith, and thusly are not individually removable.

Each airfoil 44 includes a first sidewall 54 and a second sidewall 56. First sidewall 54 is convex and defines a suction side of airfoil 44, and second sidewall 56 is concave and defines a pressure side of airfoil 44. Sidewalls 54 and 56 are joined at a leading edge 58 and at an axially-spaced trailing edge 60. More specifically, airfoil trailing edge 60 is spaced chordwise and downstream from airfoil leading edge 58.

Figure 4:
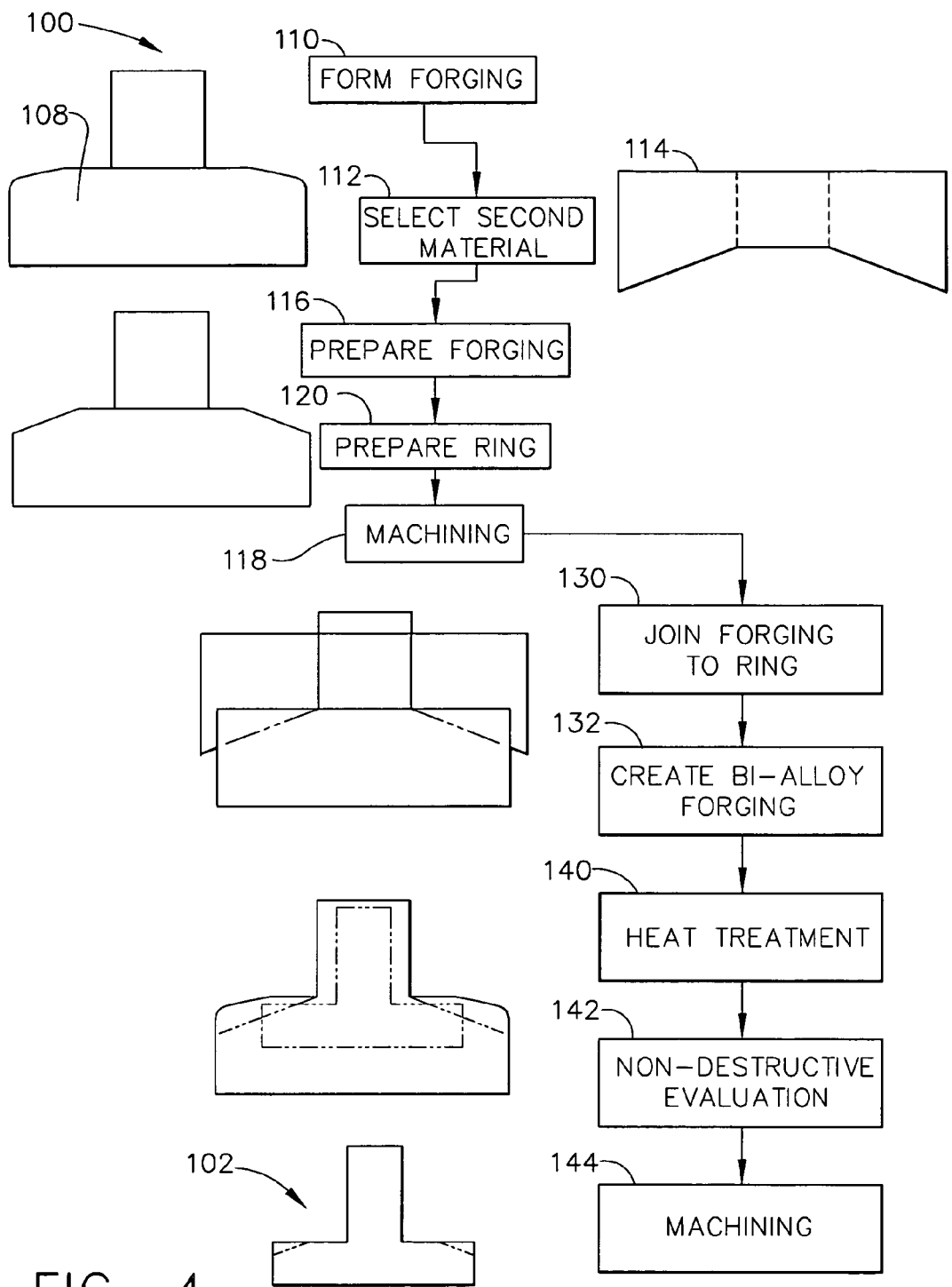
FIG. 4 is a series of schematic illustrations of a blisk during fabrication and as associated exemplary method for fabricating such blisks.

FIG. 4 is a flowchart illustrating an exemplary method 100 of fabricating a blisk, such as blisk 40, shown in FIGS. 2 and 3, and associated exemplary schematic illustrations of a blisk 102 fabricated as method 100 is performed. Initially, a blisk forging 108 is formed 110 from a first material selected to facilitate optimizing performance and design requirements with impact and wear resistance. In addition, a second material is selected 112 which has intrinsic properties that will enhance the wear resistance and impact resistance of the blisk forging 108 in those areas, such as the leading and trailing edges of the forging 108, in which the second material is joined. In the exemplary embodiment, the second material is formed into a ring of material 114.

The blisk forging 108 is prepared 116 for inertia welding. Specifically, in the exemplary embodiment, forging 108 is machined 118 to a semi-finished condition. Moreover, the ring of material 114 is also prepared 120 for inertia welding. In the exemplary embodiment, ring of material 114 is also machined 118. Machining 118 the forging 108 and the ring 114 facilitates ensuring that the ring of material 114 is seated in a pre-determined position relative to the forging 108. More specifically, machining 118 facilitates producing a resulting weld at a pre-determined location relative to forging 108. In one embodiment, machining 118 is performed automatically in a multi-axis numerically controlled lathe machine (not shown) which may be programmed with a desired fabrication of the blisk forging and its airfoils. In addition, machining 118 the forging 108 facilitates reducing the overall weight of the forging 108, thus reducing overall manufacturing costs and offsetting performance impacts.

The ring of material 114 is then joined 130 to forging 108 in an inertia welding process to create a blisk bi-alloy forging 132. Inertia welding facilitates reduced welding times and temperatures. As such, areas of the forging 108 which are not being welded are not exposed to excessive temperatures which may degrade material properties. Moreover, machining 118 facilitates the ring of material 114 being joined to the forging 108 with a single weld. Accordingly, weld distortion is not a factor in comparison to blisks manufactured using other manufacturing methods.

The bi-alloy forging is then heat-treated 140 and inspected 142 through non-destructive testing. The bi-alloy forging is then machined 144 to a pre-determined finished configuration having pre-determined dimensions. Specifically, a blisk bi-alloy forging is formed having edge materials which facilitate increasing the edge wear resistance and the impact resistance of the bi-alloy forging. Moreover, the inertia welding process produces a solid-state weld that yields defect-free weld joints and facilitates joining 130 of a wider range of materials than is possible using other known manufacturing methods.

The manufacturing methods described herein facilitate producing a blisk bi-alloy forging that includes a second material that facilitates improving the wear resistance and impact resistance of the blisk. Moreover, the manufacturing method described herein facilitates welding being performed at the forging level with a single weld being completed at a pre-determined location. Fabricating a blisk that is formed from a bi-alloy material using the methods described herein produces a blisk in a cost-effective manner that does not adversely affect the durability or strength of the blisk. Moreover, the methods described herein produce a blisk in a manner with a reduced cost and cycle time in comparison to other blisk manufacturing methods.

Although the methods and systems described and/or illustrated herein are described and/or illustrated with respect to a gas turbine engine component, and more specifically a blisk for a gas turbine engine, practice of the methods and systems described and/or illustrated herein is not limited to blisks nor to gas turbine engine components generally. Rather, the methods and systems described and/or illustrated herein are applicable to forming any component.

Exemplary embodiments of manufacturing methods are described above in detail. The methods are not limited to the specific embodiments described herein nor to the specific components being manufactured, but rather, the manufacturing method may be utilized independently and separately from other methods described herein or to manufacture other components not described herein. For example, other turbine components can also be manufactured using the methods described herein.

While the invention has been described in terms of various specific embodiments, those skilled in the art will recognize that the invention can be practiced with modification within the spirit and scope of the claims.

What is claimed is:

1. A method for fabricating a component for a gas turbine engine, said method comprising:
   providing a blisk forging fabricated from a first material, wherein the blisk forging includes at least one airfoil;
   inertia welding a second material to the blisk forging to create a bi-alloy blisk forging; and
   machining the bi-alloy blisk forging to pre-determined dimensions.

2. A method in accordance with claim 1 wherein providing a blisk forging fabricated from a first material further comprises machining the blisk forging to prepare the blisk forging for inertia welding.

3. A method in accordance with claim 2 wherein machining the blisk forging further comprises reducing an overall weight of the blisk forging prior to inertial welding a second material thereto.

4. A method in accordance with claim 1 further comprising:
   providing a ring of second material; and
   machining the ring of second material to prepare the ring for inertia welding.

5. A method in accordance with claim 1 further comprising heat-treating the bi-alloy blisk forging.

6. A method in accordance with claim 1 wherein inertia welding a second material to the blisk forging further comprises inertia welding the second material to the blisk forging to facilitate eliminating the blisk edge wear during operation of the gas turbine engine.

7. A method in accordance with claim 1 wherein inertia welding a second material to the blisk forging further comprises inertia welding the second material to the blisk forging to facilitate increasing impact resistance of the blisk forging.

8. A method in accordance with claim 1 further comprising:
   providing a ring of second material; and
   machining the blisk forging and the ring of second material prior to inertia welding such that the resulting weld is facilitated to be at a pre-determined location relative to the blisk forging.

9. A method for fabricating a turbine component, said method comprises:
   forging a mass of first material into a desired shape;
   inertia welding a second material that is different than the first material to the forging, said second material having properties that facilitate enhancing the impact resistance of the forging; and
   heat-treating the forging.

10. A method in accordance with claim 9 wherein inertial welding a second material that is different than the first material to the forging further comprises welding a second material having properties that facilitate enhancing the wear resistance of the forging.

11. A method in accordance with claim 9 wherein inertia welding a second material that is different than the first material to the forging further comprises welding a second material having properties that facilitate reducing the weight of the forging.

12. A method in accordance with claim 9 further comprising machining the forging of first material to pre-determined dimensions prior to inertia welding.

13. A method in accordance with claim 12 wherein machining the forging of first material further comprises machining the forging of first material to facilitate the second material being inertia welded to the forging at a pre-determined location.

14. A method in accordance with claim 12 wherein machining the forging of first material further comprises machining the forging of first material to facilitate reducing an overall weight of the forging prior to inertia welding the second material thereto.

15. A blisk for a gas turbine engine, wherein said blisk comprises a bi-alloy forging, said bi-alloy forging further comprises a first forging of a material inertia welded to a ring of a second material that is different than said first material, said second material chosen to facilitate increasing impact resistance of said blisk.

16. A blisk in accordance with claim 15 wherein said blisk bi-alloy forging further comprises a forging of a first material inertia welded to a ring of a second material that is different than said first material.

17. A blisk for a gas turbine engine, wherein said blisk comprises a bi-alloy forging, said bi-alloy forging further comprises a first forging of a material inertia welded to a ring of a second material that is different than said first material, said second material chosen to facilitate increasing wear resistance of said blisk.

18. A blisk in accordance with claim 17 wherein said blisk bi-alloy forging further comprises a forging of a first material inertia welded to a ring of a second material that is different than said first material.

19. A blisk in accordance with claim 17 wherein said second material is coupled to said first material with a single weld.

* * * * *